United States Patent
Ohnishi

(10) Patent No.: US 11,399,111 B2
(45) Date of Patent: Jul. 26, 2022

(54) IMAGE OUTPUT DEVICE DISALLOWING OUTPUT OF IMAGE DATA INCLUDING SPECIFIC IMAGE INFORMATION, NON-TRANSITORY STORAGE MEDIUM STORING CONTROL PROGRAM AND CONTROL METHOD OF IMAGE OUTPUT DEVICE

(71) Applicant: SHARP KABUSHIKI KAISHA, Sakai (JP)

(72) Inventor: Kazuyuki Ohnishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/187,724

(22) Filed: Feb. 26, 2021

(65) Prior Publication Data
US 2021/0289099 A1    Sep. 16, 2021

(30) Foreign Application Priority Data
Mar. 12, 2020   (JP) .............................. JP2020-043348

(51) Int. Cl.
*H04N 1/32*   (2006.01)
*G06F 3/12*   (2006.01)
*H04N 1/00*   (2006.01)

(52) U.S. Cl.
CPC ....... *H04N 1/32352* (2013.01); *G06F 3/1222* (2013.01); *G06F 3/1238* (2013.01); *G06F 3/1274* (2013.01); *H04N 1/00846* (2013.01); *H04N 1/00875* (2013.01); *H04N 1/32133* (2013.01); *H04N 1/32144* (2013.01); *H04N 1/32309* (2013.01); *H04N 2201/3269* (2013.01)

(58) Field of Classification Search
CPC .......... H04N 1/00838–00883; H04N 1/00925; H04N 1/2104; H04N 1/2376; H04N 1/32101–32496; G06K 15/1886; G06K 15/1889; G06K 15/189; G06K 15/1892; G06K 15/4095; G06F 3/1222; G06F 3/1238; G06F 3/1274
See application file for complete search history.

(56) References Cited

U.S. PATENT DOCUMENTS

| 5,604,596 A * | 2/1997 | Ukai ................... H04N 1/00843 358/296 |
| 7,463,389 B2 * | 12/2008 | Ohno ....................... B41M 3/14 358/3.28 |
| 2002/0054315 A1 * | 5/2002 | Masaki ..................... G07D 7/20 358/1.14 |

(Continued)

FOREIGN PATENT DOCUMENTS

JP    2007201898 A    8/2007

*Primary Examiner* — Scott A Rogers
(74) *Attorney, Agent, or Firm* — ScienBiziP, P.C.

(57) ABSTRACT

An image output device includes a storage and outputs image data stored the storage. The image output device includes a detector, an output controller, and an eraser. The detector detects whether or not specific image information is included in the image data. The output controller allows an output of the image data when the image data does not include the specific image information, and disallows the output of the image data when the image data includes the specific image information. The eraser erases the image data from the storage when the specific image information is included in the image data.

11 Claims, 8 Drawing Sheets

(56) References Cited

U.S. PATENT DOCUMENTS

| | | | | |
|---|---|---|---|---|
| 2004/0263891 | A1* | 12/2004 | Yamada | H04N 1/00846 358/1.13 |
| 2006/0262341 | A1* | 11/2006 | Matsuda | G03G 21/046 358/1.14 |
| 2007/0147929 | A1* | 6/2007 | Ishimoto | G03G 21/043 400/62 |
| 2009/0002778 | A1* | 1/2009 | Yasuda | H04N 1/00872 358/474 |
| 2010/0245898 | A1* | 9/2010 | Nakai | H04N 1/00854 358/1.15 |
| 2013/0301070 | A1* | 11/2013 | Saisho | H04N 1/32358 358/1.13 |
| 2019/0356815 | A1* | 11/2019 | Kubo | G06F 21/10 |

* cited by examiner

IMAGE OUTPUT DEVICE DISALLOWING OUTPUT OF IMAGE DATA INCLUDING SPECIFIC IMAGE INFORMATION, NON-TRANSITORY STORAGE MEDIUM STORING CONTROL PROGRAM AND CONTROL METHOD OF IMAGE OUTPUT DEVICE

CROSS-REFERENCE TO RELATED APPLICATION

The present application claims priority from Japanese Application JP2020-43348, the content to which is hereby incorporated by reference into this application.

BACKGROUND OF THE INVENTION

Field of the Invention

The present invention relates to an image output device, a storage medium storing a control program and a control method of the image output device, and particularly relates to an image output device which includes a storage such as a hard disk drive and outputs image data stored in the storage, and the storage medium and control method of the image output device.

Description of the Background Art

Paper media including important information such as any confidential document may be accompanied by specific image information for prohibiting copying of the paper media. For example, Japanese Unexamined Patent Application Publication No. 2007-201898 discloses a technology that, in an image forming device which is a kind of image output device, copying (printing) is not executed when a predetermined pattern as specific image information is included in the image of a manuscript read by a manuscript reading device, that is, discloses a technology for preventing any unauthorized copying. Further, Japanese Unexamined Patent Application Publication No. 2007-201898 discloses that attaching patterns of various dimensions to the manuscript allows a pattern of any dimension to be detectable (recognizable) as the specific image information, even when the manuscript is variably magnified and copied by the image forming device having no copy management function.

By the way, a multifunction machine (MFP) having multiple functions such as a copy function, a printer function, an image scanner function, and a fax function is also a kind of image forming device, that is, a kind of image output device. In this multifunction machine, as the case may be, image data is imported to the multifunction machine from an external device such as a server via a communication network, the imported image data is temporarily stored (saved) in a storage in the multifunction machine, and then, the image data is provided for printing by the multifunction machine. In this case, even when the image data stored in the storage includes the specific image information, the technology disclosed in Japanese Unexamined Patent Application Publication No, 2007-201898 described above cannot detect the specific image information and cannot prevent any unauthorized printing. In order to avoid this inconvenience, for example, there is provided a conceivable method in which when the image data stored in the storage is provided for printing by the multifunction machine, so to speak, when the image data is output, the specific image information included in the image data is detected. However, as long as the image data is stored in the storage, there is still room left for the image data to be output by some technology, in particular, by the unauthorized technology.

Therefore, it is an object of the present invention to provide a new technology that, in an image output device that includes a storage and outputs image data stored in the storage, when the image data subjected to output includes specific image information, output of the image data, in particular, output of the image data due to an unauthorized technology can be surely prevented.

SUMMARY OF THE INVENTION

In order to achieve this object, the present invention includes a first invention relating to an image output device, a second invention relating to a storage medium of the image output device storing a control program, and a third invention relating to a control method of the image output device.

Among the above, the first invention relating to an image output device includes a detector, an output controller, and an eraser. Here, the image output device includes a storage. And, the image output device outputs the image data stored in the storage. Then, the detector detects whether or not the image data subjected to output includes specific image information. The output controller allows an output of image data or disallows the output of the image data, based on the detection result by the detector. For example, when the image data does not include the specific image information, the output controller allows the output of the image data. Meanwhile, when the image data includes the specific image information, the output controller disallows the output of the image data, so to speak, cancels the output. Then, when the image data includes the specific image information, the eraser erases the image data from the storage.

The detector may include a variable magnifier and a detection executer. The variable magnifier variably magnifies the image data at a plurality of magnifications different from each other. Then, the detection executer detects whether or not the specific image information is included in each of a plurality of data after being variably magnified at the plurality of magnifications by the variable magnifier.

Here, the variable magnifier may include a plurality of individual variable magnifiers. The plurality of individual variable magnifiers is provided corresponding to the plurality of magnifications. Then, the plurality of individual variable magnifiers variably magnifies the image data at the corresponding magnifications, in short, the image data is variably magnified at the plurality of magnifications in parallel by the plurality of individual variable magnifiers.

Apart from this, the variable magnifier may variably magnify the image data sequentially, so to speak, in a time division manner at the plurality of magnifications.

Therefore, the variable magnifier may divide the image data into a plurality of blocks and variably magnify the image data sequentially, that is, in a time division manner at the plurality of magnifications for each of the blocks.

In addition, when the image data is divided into the plurality of blocks, it is desirable that the image data is sequentially divided into the blocks from a portion input first to the variable magnifier.

Further, the detection executer may include a plurality of individual detectors. The plurality of individual detectors is provided corresponding to a plurality of data after being variably magnified. Then, the plurality of individual detectors detects whether or not the specific image information is included in the respectively corresponding data after being variably magnified. In short, for each of the plurality of data after being variably magnified, so-called detection processing for detecting whether or not the specific image information is included may be executed in parallel by the plurality of individual detectors.

Apart from this, the detection executer may sequentially, so to speak, in a time division manner detect whether or not the specific image information is included in the plurality of data after being variably magnified.

In addition, the image data may be data acquired from an external device. In this case, it is desirable that an erasure controller is further provided. The erasure controller executes erasing control processing for erasing the image data from the external device when the specific image information is included in the image data.

Further, in the first invention, an image forming portion may be further provided. The image forming portion outputs the image data by forming, on an image recording medium, an image which is based on the image data.

The storage medium of the image output device according to the second invention of the present invention causes a computer of the image output, device to execute detecting, controlling an output, and erasing. Here, the image output device includes a storage and the image output device outputs the image data stored in the storage. Then, in the detecting, it is detected whether or not the image data subjected to output includes specific image information. In the controlling of the output, the output of image data is allowed or the output of the image data is disallowed, based on the detection result by the detecting. For example, when the image data does not include the specific image information, the controlling of the output allows the output of the image data. Meanwhile, when the image data includes the specific image information, the controlling of the output, disallows the output of the image data, so to speak, cancels the output. Then, in the erasing, when the image data includes the specific image information, the image data is erased from the storage.

The control method of the image output device according to the third invention of the present invention includes detecting, controlling an output, and erasing. Here, the image output device includes a storage and the image output device outputs the image data stored in the storage. Then, in the detecting, it is detected whether or not the image data subjected to output includes specific image information. In the controlling of the output, the output of the image data is allowed or the output of the image data is disallowed, based on the detection result by the detecting. For example, when the image data does not include the specific image information, the controlling of the output allows the output of the image data. Meanwhile, when the image data includes the specific image information, the controlling of the output disallows the output of the image data, so to speak, cancels the output. Then, in the erasing, when the specific image information is included in the image data, the image data is erased from the storage.

According to the present invention, in an image output device that includes a storage and outputs image data stored in the storage, when image data subjected to output includes specific image information, it is possible to reliably prevent output of the image data, in particular, the output of the image data due to an unauthorized technology.

DESCRIPTION OF THE PREFERRED EMBODIMENTS

First Embodiment

Figure 1:
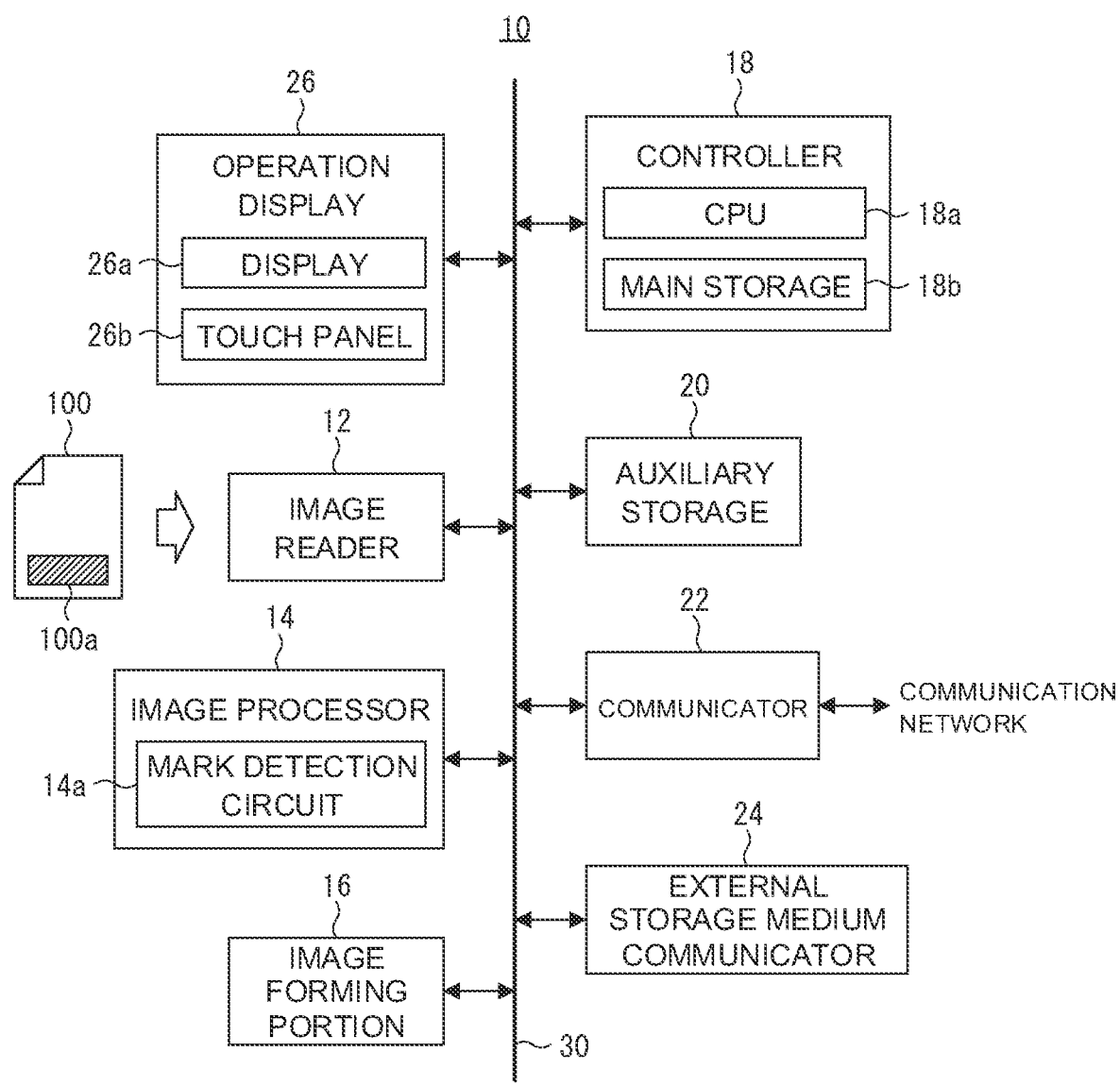
FIG. 1 is a block diagram showing an electrical configuration of a multifunction machine according to a first embodiment of the present invention.

A first embodiment of the present invention will be described by taking a multifunction machine 10 shown in FIG. 1 as an example.

The multifunction machine 10 according to the first embodiment has a plurality of functions such as a copy function, a printer function, an image scanner function, and a fax function. Therefore, the multifunction machine 10 includes an image reader 12, an image processor 14, an image forming portion 16, a controller 18, an auxiliary storage 20, a communicator 22, and an external storage medium communicator 24, and an operation display 26. These are connected via a bus 30 that is common to each of the above devices.

The image reader 12 is an example of an image reader, and is a so-called document reading device. That is, the image reader 12 is responsible for an image reading processing of reading the image of a manuscript 100 and generating any two-dimensional read image data corresponding to the thus read image. In order to realize this image reading process, the image reader 12 has a platen (not illustrated) on which the manuscript 100 is placed (set). In addition, the image reader 12 has an image reading unit including a light source, a mirror, a lens, a line sensor (each not illustrated), etc. Further, the image reader 12 is provided with a drive mechanism (not illustrated) for moving the image reading position by the image reading unit. Further, the image reader 12 may include an automatic document feeder (ADF) (not illustrated), which is one of optional devices.

The image processor 14 is an example of an image processor. That is, the image processor 14 executes appropriate image processing on various image data such as the read image data generated by the image reader 12. The image processing referred to here includes color space conversion processing for converting RUB mode image data to CMYK mode image data, variable magnification processing for enlarging or reducing the image data (based on the image), and dither processing for making image data into halftone dots. In order to realize these image processing operations, the image processor 14 has an image processing executer such as a DSP (digital signal processor) (not illustrated). In addition, the image processor 14 has a mark detection circuit 14a. The mark detection circuit 14a will be described in detail below. The mark detection circuit 14a is composed of, for example, hardware elements, and is particularly composed of an ASIC (application specific integrated circuit) (not illustrated).

The image forming portion 16 is an example of an image forming portion. That is, the image forming portion 16 forms, on paper as a sheet-shaped image recording medium (not illustrated), an image which is based on appropriate image data such as data after the image processing by the image processor 14, that is, prints the image and is responsible for image forming processing. This image forming processing is executed by, for example, a known electrophotographic method. For this reason, the image forming portion 16 includes a photoconductor drum (not illustrated), a charging device, an exposure device, a developing device, a transfer device, a fixing device (each not illustrated), and the like. The image recording medium, so to speak, a printed matter after the image is formed through the image forming processing with the image forming portion 16 is discharged to a paper ejection tray (not illustrated). The image forming portion 16 is not limited to the one for executing the electrophotographic method, and may be the one which executes the image forming processing by another method such as an inkjet method.

The controller 18 is an example of a controller that controls the overall control of the multifunction machine 10. Therefore, the controller 18 has a computer as a control executer, for example, a CPU (central processing unit) 18a. In addition, the controller 18 has a main storage 18b as a possible main memory directly accessible by the CPU 18. The main storage 18b includes a ROM (read only memory) (not illustrated) and a RAM (random access memory) (not illustrated). A control program (firmware) for controlling the operation of the CPU 18a is stored in the ROM. RAM constitutes an operation area and a buffer area for the CPU 18a to execute any processing which is based on the control program.

The auxiliary storage 20 is an example of an auxiliary storage. That is, various data such as the above read image data are appropriately stored in the auxiliary storage 20. This auxiliary storage 20 includes, for example, a hard disk drive (not illustrated). In addition, the auxiliary storage 20 may include a rewritable non-volatile memory such as a flash memory.

The communicator 22 is an example of a communicator. That is, the communicator 22 is connected to a communication network (not illustrated) and thereby is responsible for bidirectional communication via the communication network. The communication network mentioned here includes LAN (local area network), Internet, and public switched telephone network. In addition, LAN includes wireless LAN (wireless LAN conforming to the IEEE_802.11 standard, which is so-called Wi-Fi (registered trademark)).

The external storage medium communicator 24 is an example of an external storage medium communicator. That is, the external storage medium communicator 24 is responsible for bidirectional communication with an external storage medium (not illustrated). Therefore, the external storage medium communicator 24 has an external storage medium mounter (not illustrated) to which the external storage medium can be mounted. The external storage medium referred to here is, for example, a USB (universal serial bus) memory.

The operation display 26 is a so-called operation panel, and has a display 26a as an example of a display and a touch panel 26b as an example of an operation receptor. The display 26a has a substantially rectangular display surface, and the touch panel 26b is provided so as to overlap the display surface of the display 26a. The display 26a is, for example, a liquid crystal display (LCD), but is not limited to this, and may be another type of display such as an organic electroluminescence (EL) display. The touch panel 26b is, for example, an electrostatic capacitance type panel, but is not limited to this, and may be another type of panel such as an electromagnetic induction type, a resistance film type, and an infrared type. In addition, the operation display 26 has an appropriate light emitter such as a light emitting diode (LED) (not illustrated). In addition, the operation display 26 has an appropriate hardware switch such as a push button switch (not illustrated).

By the way, with the multifunction machine 10 according to the first, embodiment, for example, with the copy function, when a copy prohibition mark 100a as an example of specific image information for prohibiting the copying is attached to the manuscript 100, the copying of the manuscript 100 is not executed, that is, any unauthorized copying is prevented. That is, the multifunction machine 10 according to the first embodiment is provided with an image output control function for preventing the copying of the manuscript 100 to which the copy prohibition mark 100a is attached, strictly speaking, prevents the output of the image data including the copy prohibition mark 100a.

Figure 2:
FIG. 2 is a diagram showing a copy prohibition mark in the first embodiment.

Specifically, the manuscript 100 including any important information such as a confidential document may be attached with the predetermined copy prohibition mark 100a. The copy prohibition mark. 100a is, for example, a circular symbol (graphic) as shown in FIG. 2, and is attached to a part or entirety of the manuscript 100 (a surface on which information is recorded) in a predetermined arrangement, that is, a plurality of copy prohibition marks 100a is attached. In addition, the copy prohibition mark 100a is attached in a manner that is difficult to recognize with any naked eye. For example, the diameter of each copy prohibition mark. 100a is less than 1 mm in other words, each copy prohibition mark 100a is attached in a size that fits within a square area with a side of less than 1 mm. In addition, the copy prohibition mark 100a is attached in a color that, is difficult to recognize with the naked eye, such as yellow. The copy prohibition mark 100a is attached by an image forming device having a function of attaching the copy prohibition mark 100a, for example, attached when the manuscript 100 is created (at the time of printing for that purpose). The multifunction machine 10 according to the first embodiment also has a function of attaching the copy prohibition mark 100a.

In the copy function, the image of the manuscript 100 is read by the image reader 12, and the read image data is temporarily stored in the auxiliary storage 20. Here, for example, when the copy prohibition mark 100a is attached to the manuscript 100, the read image data including the copy prohibition mark 100a is stored in the auxiliary storage 20. The read image data stored in the auxiliary storage 20 is read out from the auxiliary storage 20 and input to the image processor 14. The read image data input to the image processor 14 is subjected to an appropriate image processing by the image processor 14, and in the process, is input to the mark detection circuit 14a, for example, in the step of being shaped into a proper mode to be subjected to the mark detection processing by the mark detection circuit 14a.

Figure 3:
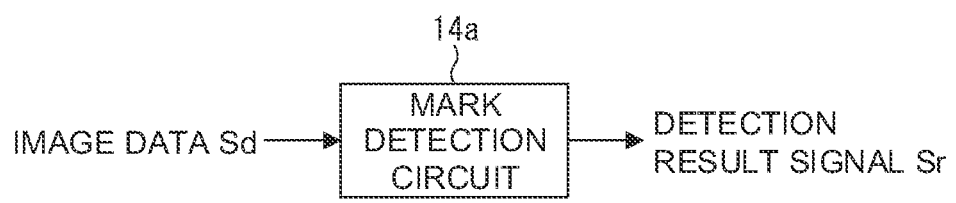
FIG. 3 is a diagram showing a configuration of a mark detection circuit in the first embodiment.

The mark detection circuit 14a executes the mark detection processing on the image data input to itself as shown in FIG. 3, that is, on the image data Sd subjected to mark detection processing. In this mark detection processing, it is detected whether or not the image data Sd includes the copy prohibition mark 100a, and in detail, it is detected whether or not there is a plurality of copy prohibition marks 100a (more than or equal to a predetermined number) following the above predetermined sequence. Then, the mark detection circuit 14a outputs a detection result signal Sr showing the result of the mark detection processing. This detection result signal Sr is input to the CPU 18a.

Based on the detection result signal Sr, that is, based on the result of the mark detection processing, the CPU 18a allows the printing which is based on the read image data or disallows the printing. For example, when the image data Sd does not include the copy prohibition mark 100a, that is, when such detection result signal Sr is input, the CPU 18a allows the printing which is based on the read image data. As a result, the printing which is based on the read image data is executed, and strictly speaking, printing based on the data after the appropriate image processing (so-called printing raster data) by the image processor 14 is executed. Meanwhile, when the image data Sd includes the copy prohibition mark 100a, the CPU 18a disallows the printing which is based on the read image data and, so to speak, cancels the printing. As a result, the printing which is based on the read image data is not executed, and when the printing is already being executed, the printing is immediately stopped (interrupted). In addition, when the image data Sd includes the copy prohibition mark 100a, the CPU 18a erases the read image data from the auxiliary storage 20. Further, even when the image data Sd does not, include the copy prohibition mark 100a, in other words, even when the printing based on the read image data is executed, the CPU 18a erases the read image data from the auxiliary storage 20 after the printing is completed.

In this way, in the copy function, only when the copy prohibition mark 100a is not included in the image data Sd, so to speak, only when the read image data subjected to printing does not include the copy prohibition mark 100a, the printing based on the read image data is executed, that is, copying of the manuscript 100 is executed. Meanwhile, when the read image data subjected to printing includes the copy prohibition mark 100a, the printing based on the read image data is not executed, and when the printing is already being executed, the printing will be immediately stopped. This prevents any unauthorized copying. In addition, when the read image data subjected to printing includes the copy prohibition mark 100a, the read image data is erased from the auxiliary storage 20. That is, the read image data including the copy prohibition mark 100a is not left in the auxiliary storage 20.

Such an image output control function is applied not only to the copy function but also to the printer function, for example.

Specifically, in the printer function, the image data subjected to printing is transmitted from the external device such as a personal computer (not illustrated) to the multifunction machine 10 via the above communication network. The image data transmitted from this external device to the multifunction machine 10 may also include the copy prohibition mark 100a. In other words, any image data including the copy prohibition mark 100a may be transmitted from the external device to the multifunction machine 10.

The image data transmitted from the external device to the multifunction machine 10 is temporarily stored in the auxiliary storage 20 after being received by the multifunction machine 10. Then, the image data stored in the auxiliary storage 20 is read out from the auxiliary storage 20 and input to the image processor 14. The image data input to the image processor 14 is subjected to an appropriate image processing by the image processor 14, and in the process, is input to the mark detection circuit 14a, for example, in the step of being shaped into a proper mode to be subjected to the mark detection processing by the mark detection circuit 14a. After this, the same as in the copy function applies.

That is, the mark detection circuit 14a executes the mark detection processing on the image data input to itself, that is, on the image data Sd subjected to mark detection processing. Then, the mark detection circuit 14a outputs the detection result signal Sr showing the result of the mark detection processing. This detection result signal Sr is input, to the CPU 18a.

Based on the detection result signal Sr, the CPU 18a allows the printing which is based on the image data subjected to printing, that is, the image data received from the external device, or disallows the printing. For example, when the image data Sd does not include the copy prohibition mark 100a, the CPU 18a allows the printing which is based on the image data subjected to printing. Meanwhile, when the image data Sd includes the copy prohibition mark 100a, the CPU 18a disallows the printing. In addition, when the image data Sd includes the copy prohibition mark 100a, the CPU 18a erases the image data subjected to printing from the auxiliary storage 20. Further, even when the image data Sd does not include the copy prohibition mark 100a, in other words, even when the printing is executed based on the image data subjected to printing, the CPU 18a erases the image data from the auxiliary storage 20 after the printing is completed.

In this way in the print function as well, only when the copy prohibition mark 100a is not included in the image data Sd, that is, only when the image data subjected to printing does not include the copy prohibition mark 100a, the printing based on the image data is executed, Meanwhile, when the image data subjected to printing includes the copy prohibition mark 100a, the printing is not executed, and when the printing is already being executed, the printing is immediately stopped. This prevents any unauthorized printing. In addition, when the image data subjected to printing includes the copy prohibition mark 100a, the image data is erased from the auxiliary storage 20. That is, the image data received from the external device, when including the copy prohibition mark 100a, is not, left in the auxiliary storage 20.

Further, in the printer function, the image data subjected to printing may be imported to the multifunction machine 10 from an element other than the external device, for example, from the above USB memory. Any image data imported from any element other than the external device such as this USB memory is also handled in the same way as the image data imported from the external device. That is, even for the image data imported from the element other than the external device such as a USB memory, printing based on the image data is executed only when the copy prohibition mark 100a is not included in the image data. Meanwhile, when the image data imported from the element other than the external device such as a USB memory includes the copy prohibition mark 100a, printing is not executed, and when the printing is already being executed, the printing will be immediately stopped. In addition, when the image data includes the copy prohibition mark 100a, the image data (stored in the auxiliary storage 20) is erased from the auxiliary storage 20.

Further, the image output control function is also applied to the image scanner function.

Specifically; in the image scanner function, the image of the manuscript 100 is read by the image reader 12, and the read image data is temporarily stored in the auxiliary storage 20. Then, the read image data stored in the auxiliary storage 20 is read out from the auxiliary storage 20 for the purpose of being output to an appropriate output destination such as the external device or USB memory above, and input to the image processor 14. The read image data input to the image processor 14 is subjected to an appropriate image processing by the image processor 14, and in the process, is input to the mark detection circuit 4a, for example, in the step of being shaped into a proper mode to be subjected to the mark detection processing by the mark detection circuit 14a.

Similar to the above, the mark detection circuit 14a executes the mark detection processing on the image data input to itself, that is, on the image data Sd subjected to mark detection processing. Then, the mark detection circuit 14a outputs the detection result signal Sr showing the result of the mark detection processing. This detection result signal Sr is input to the CPU 18a.

Based on the detection result signal Sr, the CPU 18a allows the output of the read image data subjected to output, or disallows the output. For example, when the image data. Sd does not include the copy prohibition mark 100a, the CPU 18a allows the output of the read image data. With this, the read image data is output to the appropriate output destination, and strictly speaking, the data after the appropriate image processing by the image processor 14 is output to the output destination. Meanwhile, when the image data Sd includes the copy prohibition mark 100a, the CPU 18a disallows the output of the read image data. In addition, when the image data Sd includes the copy prohibition mark 100a, the CPU 18a erases the read image data from the auxiliary storage 20. Further, even when the image data Sd does not include the copy prohibition mark 100a, in other words, even when the read image data is output to the appropriate output destination, the CPU 18a erases the read image from the auxiliary storage 20 after the output of the read image data is completed.

In this way, in the image scanner function, only when the copy prohibition mark 100a is not included in the image data Sd, that is, only when the read image data subjected to output does not include the copy prohibition mark 100a, the read image data is output. Meanwhile, when the read image data subjected to output includes the copy prohibition mark 100a, the read image data is not output, so to speak, the output of the read image data is prohibited. In addition, when the read image data subjected to output includes the copy prohibition mark 100a, the read image data is erased from the auxiliary storage 20, That, is, the read image data, when including the copy prohibition mark 100a, is not left in the auxiliary storage 20.

The image output control function is also applied to the fax function.

Specifically, in the fax function, for example, in the fax reception function, the copy prohibition mark 100a may be included in the fax reception data received from a counterpart device (not illustrated). This fax reception data is temporarily stored in the auxiliary storage 20. Then, for the purpose of being provided for printing, or for the purpose of being output to the appropriate output destination such as the above external device or USB, that is, for the purpose of output including printing, the fax reception data stored in the auxiliary storage 20 is read out from the auxiliary storage 20 and input to the image processor 14. The read image data input to the image processor 14 is subjected to an appropriate image processing by the image processor 14, and in the process, is input to the mark detection circuit 14a, for example, in the step of being shaped into a proper mode to be subjected to the mark detection processing by the mark detection circuit 14a.

Similar to the above, the mark detection circuit 14a executes the mark detection processing on the image data input to itself, that is, on the image data Sd subjected to mark detection processing. Then, the mark detection circuit 14a outputs the detection result signal Sr showing the result of the mark detection processing. This detection result signal Sr is input to the CPU 18a.

Based on the detection result signal Sr, the CPU 18a allows the output (including printing) of the fax reception data, or disallows the output. For example, when the image data Sd does not include the copy prohibition mark 100a, the CPU 18a allows the output of the fax reception data. With this, the fax reception data, strictly speaking, the data after the appropriate it age processing by the image processor 14 is provided for the printing or output to the appropriate output destination. Meanwhile, when the image data Sd includes the copy prohibition mark 100a, the CPU 18a disallows the output of the fax reception data. In addition, when the image data Sd includes the copy prohibition mark 100a, the CPU 18a erases the fax reception data from the auxiliary storage 20. Further, even when the image data Sd does not include the copy prohibition mark 100a, in other words, even when the fax reception data is output, the CPU 18a erases the fax reception data from the auxiliary storage 20 after the output of the fax reception data is completed.

In this way, in the fax reception function, the fax reception data is output only when the image data Sd does not include the copy prohibition mark. 100a, that is, only when the fax reception data does not include the copy prohibition mark 100a. Meanwhile, when the fax reception data includes the copy prohibition mark 100a, the fax reception data will not be output. In addition, when the fax reception data includes the copy prohibition mark 100a, the fax reception data is erased from the auxiliary storage 20. That is, the fax reception data, when including the copy prohibition mark 100a, is not, left in the auxiliary storage 20.

Then, in the fax transmission function of the fax functions, for example, the image of the manuscript 100 is read by the image reader 12, and the read image data is temporarily stored in the auxiliary storage 20. The read image data stored in the auxiliary storage 20 is read out from the auxiliary storage 20 and input to the image processor 14. The read image data input to the image processor 14 is subjected to an appropriate image processing by the image processor 14, and in the process, is input to the mark detection circuit 14a, for example, in the step of being shaped into a proper mode to be subjected to the mark detection processing by the mark detection circuit 14a.

Similar to the above, the mark detection circuit 14a, executes the mark detection processing on the image data input to itself, that is, on the image data Sd subjected to mark detection processing. Then, the mark detection circuit 14a outputs the detection result signal Sr showing the result of the mark detection processing. This detection result signal. Sr is input to the CPU 18a.

Based on the detection result signal Sr, the CPU 18a allows the transmission of the read image data as fax transmission data, that is, allows the output, or disallows the output. For example, when the image data Sd does not include the copy prohibition mark 100a, the CPU 18a allows the output of the fax transmission data. With this, the read image data, strictly speaking, the data after the appropriate image processing by the image processor 14 is transmitted, as fax transmission data, to the counterpart device. Meanwhile, when the image data Sd includes the copy prohibition mark 100a, the CPU 18a disallows the output of the fax transmission data. In addition, when the copy prohibition mark 100a is included in the image data Sd, the CPU 18a erases the read image data (strictly speaking, original data of the fax transmission data) as the fax transmission data from the auxiliary storage 20. Even when the image data Sd does not include the copy prohibition mark 100a, that is, even when the fax transmission data is transmitted to the counterpart device, the CPU 18a erases the read image data as the fax transmission data from the auxiliary storage 20 after the transmission of the fax transmission data is completed.

In this way, in the fax transmission function, only when the image data Sd does not include the copy prohibition mark 100a, that is, only when the read image data as the fax transmission data does not include the copy prohibition mark 100a, the fax transmission data is output. Meanwhile, when the read image data as the fax transmission data includes the copy prohibition mark 100a, the fax transmission data is not output. In addition, when the read image data as the fax transmission data includes the copy prohibition mark 100a, the read image data is erased from the auxiliary storage 20. That is, the read image data as the fax transmission data, when including the copy prohibition mark 100a, is not left in the auxiliary storage 20.

In addition, in the fax transmission function, the image data imported to the multifunction machine 10 from the above external device or USB memory may be transmitted as the fax transmission data, that is, the imported image data may be subject to output. In this way, the image data imported from the external device or USB memory is also handled in the same way as when the read image data is subject to output. That is, even for any image data imported from the external device or USB memory, the image data is transmitted as the fax transmission data only when the copy prohibition mark 100a is not included in the image data. Meanwhile, when the image data imported from the external device or USB memory includes the copy prohibition mark 100a, transmission of the image data as the fax transmission data is postponed and the image data (stored in the auxiliary storage 20) is erased from the auxiliary storage 20.

In addition, in the multifunction machine 10, for example, the appropriate image data is imported to the multifunction machine 10 from the external device or the USB memory, and, for the purpose of temporary or permanent storage in the auxiliary storage 20, the thus imported image data may be stored in the auxiliary storage 20. In such a so-called data storage function, the image data stored in the auxiliary storage 20, so to speak, any saved data is read out from the auxiliary storage 20 as needed. Then, the saved data read out from the auxiliary storage 20 is provided for printing or is output to the appropriate output destination, that is, is appropriately output, including printing. The image output, control function is also applied to this data save function.

Specifically, even in the data storage function, the saved data (image data) read out from the auxiliary storage 20 is input, to the image processor 14. Then, the saved data input to the image processor 14 is subjected to an appropriate image processing by the image processor 14, and in the process, is input to the mark detection circuit 14a, for example, in the step of being shaped into a proper mode to be subjected to the mark detection processing by the mark detection circuit 14a.

Similar to the above, the mark detection circuit 14a executes the mark detection processing on the saved data input to itself, that is, on the image data Sd subjected to mark detection processing. Then, the mark detection circuit 14a outputs the detection result signal Sr showing the result of the mark detection processing. This detection result, signal Sr is input to the CPU 18a.

The CPU 18a allows or disallows the output (including printing) of the saved data based on the detection result, signal Sr. For example, when the image data Sd does not include the copy prohibition mark 100a, the CPU 18a allows the output of the saved data. As a result, the saved data, strictly speaking, the data after the appropriate image processing by the image processor 14 is provided for printing or output to the appropriate output destination. Meanwhile, when the image data Sd includes the copy prohibition mark 100a, the CPU 18a disallows the output of the saved data. In addition, when the image data Sd includes the copy prohibition mark 100a, the CPU 18a erases the saved data from the auxiliary storage 20. Further, when the image data Sd does not include the copy prohibition mark 100a, the CPU 18a does not erase the saved data from the auxiliary storage 20, that is, the saved data is left in the auxiliary storage 20.

In this way, in the data save function, the saved data is output only when the image data Sd does not include the copy prohibition mark 100a, that is, only when the saved data does not include the copy prohibition mark 100a. Meanwhile, when the saved data includes the copy prohibition mark 100a, the saved data will not be output. In addition, when the saved data includes the copy prohibition mark 100a, the saved data is erased from the auxiliary storage 20. That is, the saved data, when including the copy prohibition mark 100a, is not left in the auxiliary storage 20.

Figure 4:
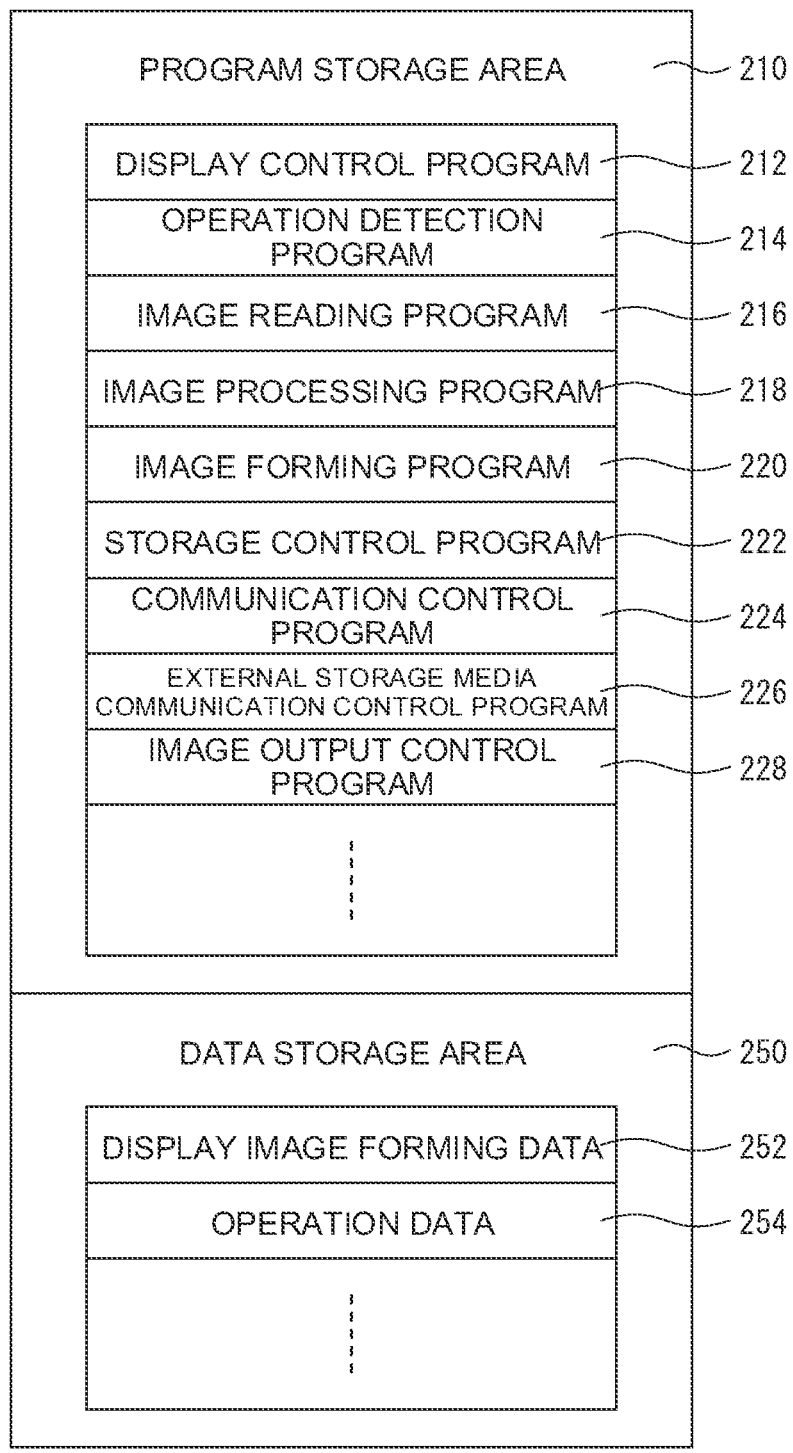
FIG. 4 is a memory map that conceptually shows a configuration of a main storage in RAM in the first embodiment.

Here, FIG. 4 shows a memory map 200 that conceptually shows the configuration in a RAM of the main storage 18b.

As shown in this memory map 200, the RAM has a program storage area 210 and a data storage area 250. The above control program is stored in the program storage area 210 of these. Specifically, the control program includes a display control program 212, an operation detection program 214, an image reading program 216, an image processing program 218, an image forming program 220, a storage control program 222, a communication control program 224, a communication control program 224, and an external storage medium communication control program 226. In addition, the control program includes an image output control program 228.

The display control program 212 is a program for generating display screen data necessary for displaying various screens such as appropriate operation screens on the display 26a. The operation detection program 214 is a program for detecting the operation status to the touch panel 26b. The image reading program 216 is a program for controlling the image reader 12. The image processing program 218 is a program for controlling the image processor 14. The image forming program 220 is a program for controlling the image forming portion 16. The storage control program 222 is a program for controlling the auxiliary storage 20. The communication control program 224 is a program for controlling the communicator 22. The external storage medium communication control program 226 is a program for controlling the external storage medium communicator 24. Then, the image output control program 228 is a program for causing the CPU 18a to execute an image output control task described below.

Meanwhile, various data are stored in the data storage area 250. Various data referred to here include display image generation data 252, operation data 254 and the like.

The display image generation data 252 is data such as polygon data and texture data used for generating display screen data which is based on the above display control program 212. The operation data 254 is data that shows the operation status to the touch panel 26b, and specifically, is time-series data that shows the touch position (coordinate) of a user with respect to the touch panel 26b.

Figure 5:
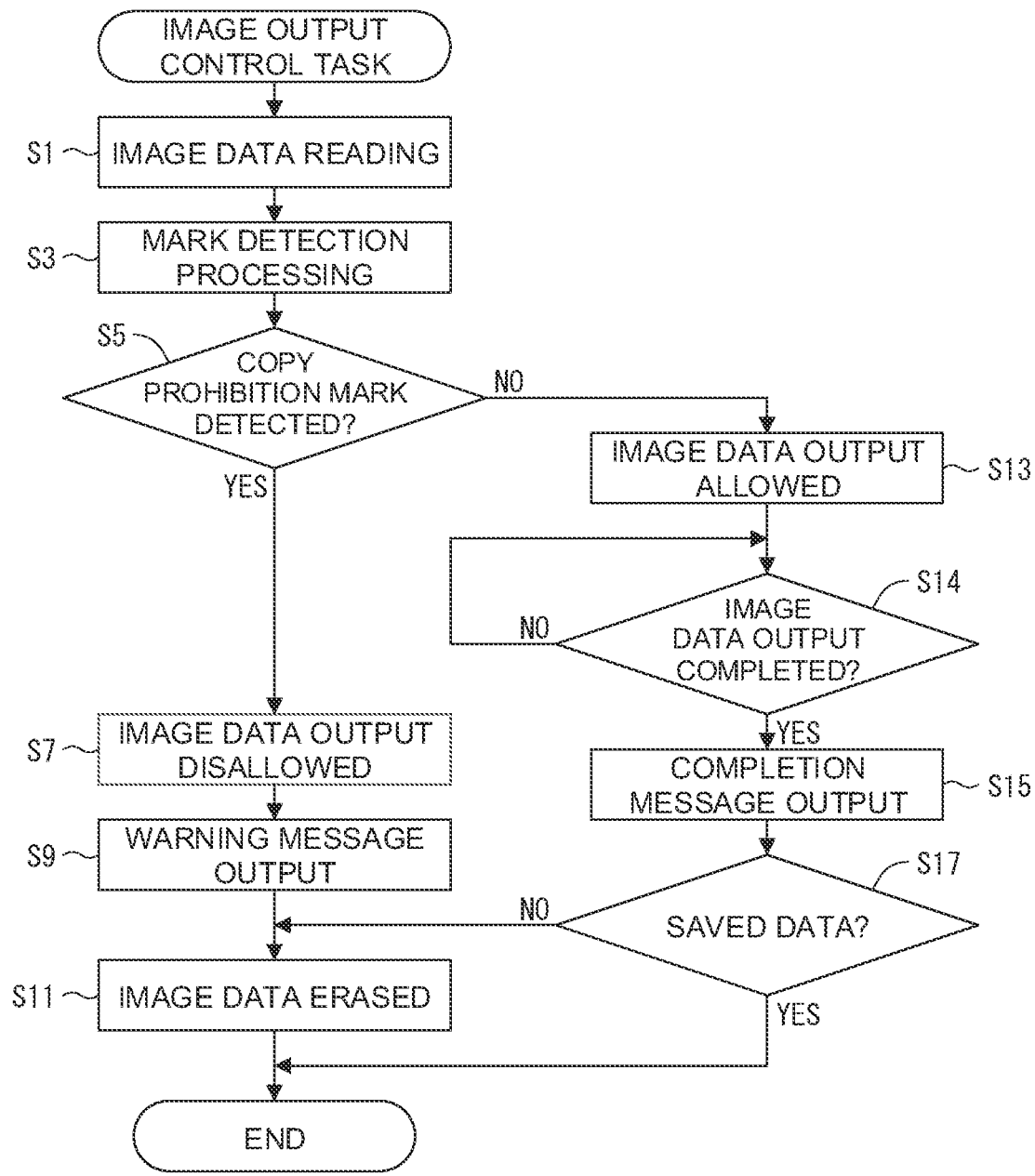
FIG. 5 is a flow chart showing the flow of an image output control task in the first embodiment.

As described above, with the multifunction machine 10 according to the first embodiment, in particular, with the image output control function, only when the image data subjected to output does not include the copy prohibition mark 100a, the image data is output. Meanwhile, when the image data subjected to output includes the copy prohibition mark. 100a, the image data is not output and the image data is erased from the auxiliary storage 20. In order to realize such an image output control function, the CPU 18a executes the image output control task according to the image output control program 228 above, FIG. 5 shows the flow of this image output control task. Further, the image output control task is executed when the timing for reading out the image data subjected to output from the auxiliary storage 20 has come.

According to this image output control task, the CPU 18a first, in step S1, reads out the image data subjected to output from the auxiliary storage 20. The image data read out from the auxiliary storage 20 is input to the image processor 14. After executing this step S1, the CPU 18a advances the processing to step S3.

In step S3, the CPU 18a controls the image processor 14 including the mark detection circuit 14a to thereby execute the mark detection processing by the mark detection circuit 14a. Then, the CPU 18a advances the processing to step S5.

In step S5, the CPU 18a determines whether or not the copy prohibition mark 100a is detected by the mark detection processing in step S3. This determination is made based on the above detection result signal Sr. Here, for example, when the copy prohibition mark 100a is detected, that is, when the copy prohibition mark 100a is included in the image data subjected to output (S5: YES), the CPU 18a advances the processing to step S7. Meanwhile, when the copy prohibition mark 100a is not detected (S5: NO), the CPU 18a advances the processing to step S13 which will be described below.

In step S7, the CPU 18a disallows the output of the image data subjected to output. With this, the output of the image data subjected to output, is postponed. Then, the CPU 18a advances the processing to step S9.

In step S9, the CPU 18a outputs a predetermined warning message indicating that the output of the image data is disallowed, and displays, for example, a warning message screen (not illustrated) on the display 26a. Further, when the multifunction machine 10 is provided with a voice output such as a speaker (not illustrated), the warning message may be output with a voice from the voice output. The output of this warning message will continue for a certain period, for example, a few seconds. Then, the CPU 18a advances the processing to step S11.

In step S11, from the auxiliary storage 20, the CPU 18a erases the image data with disallowed output. With the execution of this step S11, the CPU 18a ends the image output control task.

In addition, when the CPU 18a advances the processing from the above step S5 to step S13, the CPU 18a allows, in step S13, the output of the image data subjected to output. With this, the image data is output, and strictly speaking, the output of the image data is started. Then, the CPU 18a advances the processing to step S14.

In step S14, the CPU 18a waits for completion of the output of the image data started in step S13 (S14: NO). When the output of this image data is completed (S14: YES), the CPU 18a advances the processing to step S15.

In step S15, the CPU 18a outputs a predetermined completion message indicating that the output of the image data is completed, and displays, for example, a completion message screen (not illustrated) on the display 26a. When the multifunction machine 10 is provided with the above voice output, the completion message may be output with the voice from the voice output. The output of this completion message will also continue for a certain period, for example, a few seconds, After that, the CPU 18a advances the processing to step S17.

In step S17, the CPU 18a determines whether the image data provided for output is the above saved data. Here, for example, when the image data provided for output is the saved data (S17: YES), the CPU 18a ends the image output control task as it is. Meanwhile, when the image data provided for output is not the saved data (S17: NO), the CPU 18a advances the processing to step S11 in order to erase the image data from the auxiliary storage 20.

As described above, with the multifunction machine 10 according to the first embodiment, in particular, with the image output control function, only when the image data subjected to output does not include the copy prohibition mark 100a, the image data is output. Meanwhile, when the image data subjected to output, includes the copy prohibition mark 100a, the image data is not output and the image data is erased from the auxiliary storage 20. Therefore, the image data including the copy prohibition mark 100a is not output, that is, the output of the image data is surely prevented. That is, the image data whose copying is prohibited is preserved.

Further, although detailed description including illustration is omitted, a preview image based on the image data subjected to output can be displayed on the display 26a, so to speak, the image data can be output as the preview image. The image output control function may also be applied to this so-called preview function. In this case, only when the image data subjected to output does not include the copy prohibition mark 100a, the preview image based on the image data is displayed on the display 26a. When the copy prohibition mark 100a is included in the image data subjected to output, the preview image based on the image data is not displayed, and the image data is erased from the auxiliary storage 20.

Figure 6:
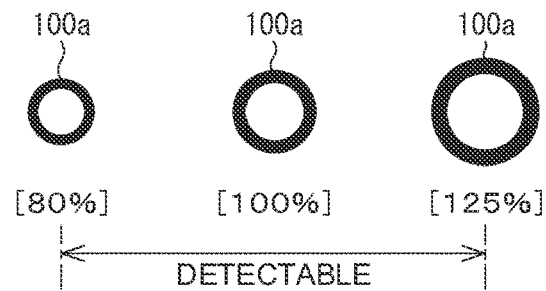
FIG. 6 is a diagram showing a range of the size of the copy prohibition mark detectable by the mark detection circuit in the first embodiment.

The mark detection circuit 14a in the first embodiment has a detectable range, for example, as shown in FIG. 6, with respect to the size of the copy prohibition mark 100a. That is, when the size of the original (ideal) copy prohibition mark 100a is 100%, the mark detection circuit 14a can detect the copy prohibition mark 100a having 80% to 125% of the original size. With this, output, by any unauthorized means, of the image data including the copy prohibition mark 100a can be prevented.

Specifically, for example, it is assumed that the manuscript 100 to which the copy prohibition mark 100a with the original size is attached is subjected to a variable magnification copy (enlarged copy or reduced copy) at an appropriate magnification in the range of 80% to 125% by a multifunction machine or a copy machine (each not illustrated) that does not has the image output control function. Then, it is assumed that the image of the manuscript 100 that has been subjected to the variable magnification copy, that is, the image including the copy prohibition mark 100a having a size of 80% to 125% of the original size is read by the image reader 12, and the read image data is stored in the auxiliary storage 20. Even when the read image data including the copy prohibition mark 100a which does not have the original size is subject to output, the mark detection circuit 14a can detect the copy prohibition mark 100a included in the read image data (strictly speaking, image data Sd subjected to the mark detection circuit 14a). This prevents the output of the read image data including the copy prohibition mark 100a which does not have the original size. That is, output, by any unauthorized means, of the image data including the copy prohibition mark 100a can be prevented. This also applies to, for example, a case in which the image of the manuscript 100 to which the copy prohibition mark 100a of the original size is attached is photographed with a digital still camera at an appropriate magnification in the range of 80% to 125%, and the photographed image data is combined is transferred to the multifunction machine 10 and becomes the output target by the multifunction machine 10.

The auxiliary storage 20 in the first embodiment is an example of the storage according to the present invention. The mark detection circuit 14a in the first embodiment, is an example of the detector according to the present invention. Further, the CPU 18a in the first embodiment, in particular, the CPU 18a for executing the Image output control task is an example of the output controller according to the present invention, and is also an example of the eraser according to the present invention.

Second Embodiment

Next, a second embodiment of the present invention will be described.

Figure 7:
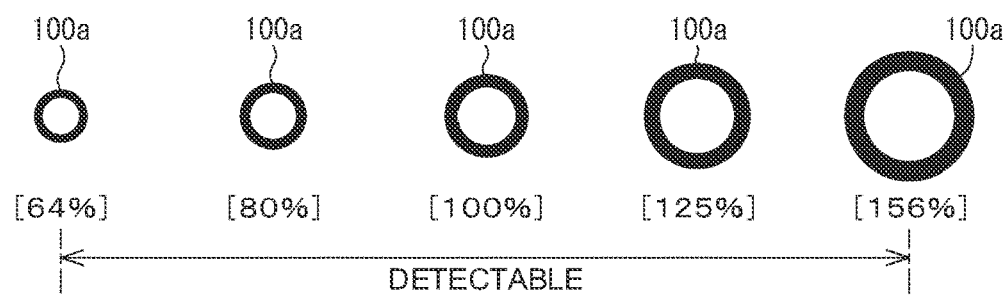
FIG. 7 is a diagram showing a range of size of the copy prohibition mark detectable by the mark detection circuit in a second embodiment of the present invention.

In the second embodiment, the range of the size of the copy prohibition mark 100a detectable by the mark detection circuit 14a is extended as shown in FIG. 7. That is, in the first embodiment, the range of the size of the copy prohibition mark 100a detectable by the mark detection circuit 14a, is the range of 80% to 1.25% of the original size as shown in FIG. 6. Meanwhile, the range of the size of the copy prohibition mark 100a detectable by the mark detection circuit 14a in the second embodiment is a range of 64% to 156% of the original size as shown in FIG. 7. Therefore, the mark detection circuit 14a in the second embodiment has a configuration as shown in FIG. 8.

Figure 8:
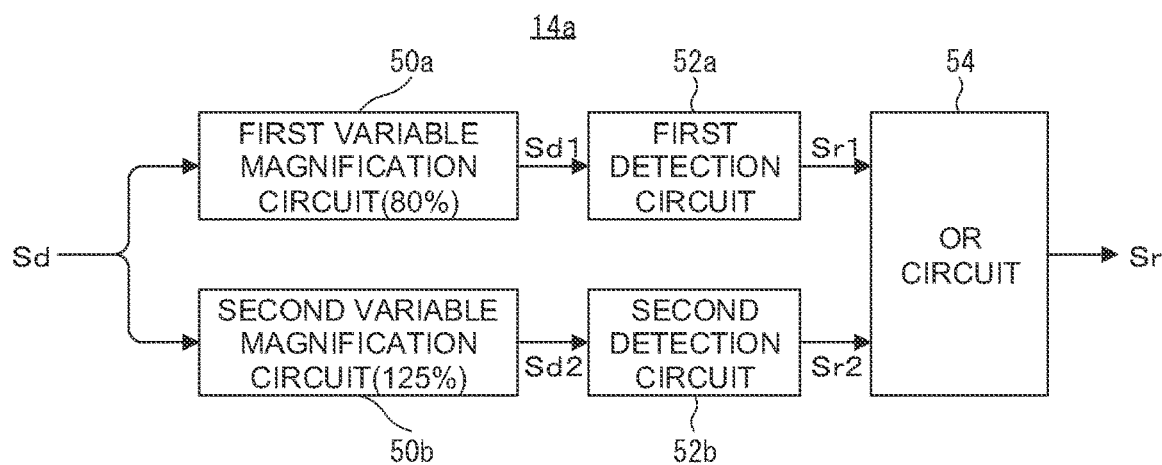
FIG. 8 is a diagram showing the configuration of the mark detection circuit in the second embodiment.

As shown in FIG. 8, the mark detection circuit 14a according to the second embodiment has two variable magnification circuits, that is, a first variable magnification circuit 50a and a second variable magnification circuit 50b. These two variable magnification circuits 50a and 50b are elements separate from the above elements responsible for the variable magnification processing (image processing executer), and are absolutely elements that form a part of the mark detection circuit 14a. Then, the image data Sd subjected to mark detection processing is input to each of these two variable magnification circuits 50a and 50b.

The first variable magnification circuit 50a executes the variable magnification processing at a magnification of 80% on the image data Sd input to itself, and executes so-called reduction processing. The image data Sd1 after the reduction processing is input to a first detection circuit 52a provided corresponding to the first variable magnification circuit 50a, in other words, provided corresponding to the image data Sd1 after the reduction processing. Meanwhile, the second variable magnification circuit 50b executes the variable magnification processing at a magnification of 1.25% on the image data Sd input to itself, and executes so-called enlargement processing. The image data Sd1 after the enlargement processing is input to a second detection circuit 52b provided corresponding to the second variable magnification circuit 50h, in other words, provided corresponding to the image data Sd2 after the enlargement processing.

The first detection circuit 52a executes the mark detection processing on the image data Sd1 after the reduction processing, that is, detects whether or not the image data Sd1 after the reduction processing includes the copy prohibition mark 100a. Then, the first detection circuit 52a outputs the first detection result signal Sr1 showing the result of the mark detection processing by itself. This first detection result signal. Sr1 is input to an OR circuit 54. Meanwhile, the second detection circuit 52h executes the mark detection processing on the image data Sd2 after the enlargement processing, that is, detects whether or not the image data Sd2 after the enlargement processing includes the copy prohibition mark 100a. Then, the second detection circuit 52h outputs the second detection result signal Sr2 showing the result of the mark detection processing by itself. This second detection result; signal Sr2 is also input to the OR circuit 54.

The OR circuit 54 takes the OR (logical addition) of the first detection result signal Sr1 and the second detection result signal Sr2, and outputs the detection result signal Sr showing the result thereof. For example, when the copy prohibition mark 100a is not detected by either the first detection circuit 52a or the second detection circuit 52b, that is, when such a first detection result signal Sr1 and such a second detection result signal Sr2 are input, the OR circuit 54 outputs the detection result signal Sr indicating that the image data Sd does not include the copy prohibition mark. 100a. Meanwhile, when the copy prohibition mark. 100a is detected by at least one of the first detection circuit 52a and the second detection circuit 52b, the OR circuit 54 outputs the detection result signal Sr indicating that the image data Sd includes the copy prohibition mark 100a.

The detection result signal Sr output from the OR circuit 54, that is, the detection result signal Sr as the output signal of the mark detection circuit 14a is input to the CPU 18a. After that, the same processing operations as those of the first embodiment including the processing by the CPU 18a is applied.

In this way, according to the second embodiment, the range of the size of the copy prohibition mark 100a detectable by the mark detection circuit 14a is extended, and more specifically, extended to 64% to 156% of the original size as shown in FIG. 7. Therefore, according to the second embodiment, it is possible to deal with the size of the copy prohibition mark 100a in a wider range (so to speak, flexibly), and further, output, by any unauthorized means, of the image data including the copy prohibition mark 100a can be prevented more reliably. In other words, more reliable preservation of the image data for which copying is prohibited is achieved.

In this second embodiment, two variable magnification circuits, the first variable magnification circuit 50a and the second variable magnification circuit 50b, are provided, that is, the image data Sd subjected to mark detection processing is magnified at 80% and 125%, two different magnifications, but the present invention is not limited to this. For example, three or more variable magnification circuits may be provided, that is, the image data Sd may be magnified at three or more different magnifications. In this case, for example, three or more detection circuits are provided according to the number of variable magnification circuits, that is, corresponding to respective variable magnification circuits. Then, the detection result signal, which is the output signal of each detection circuit, is given to the OR circuit 54. According to this configuration, the range of the size of the copy prohibition mark 100a detectable by the mark detection circuit 14a is further extended.

Further, in the second embodiment, two detection circuits, the first detection circuit 52a and the second detection circuit 52b, are provided, that is, two detection circuits corresponding to two variable magnification circuits, the first variable magnification circuit 50a and the second variable magnification circuit 50b are provided, but the present invention is not limited to this. For example, only one detection circuit may be provided, and by this one detection circuit, the image data Sd1 and Sd2 after the two variable magnification processing operations by the two variable magnification circuits 50a and 50b may be sequentially subjected to the mark detection processing in a so-called time division manner. This also applies when three or more variable magnification circuits are provided as described above.

The first variable magnification circuit 50a and the second variable magnification circuit 50b in the second embodiment are each an example of the variable magnifier according to the present invention, and are each particularly an example of an individual variable magnifier according to the present invention. The first detection circuit 52a and the second detection circuit 52b in the second embodiment are each an example of the detection executer according to the present invention, and are each particularly an example of an individual detector according to the present invention.

Third Embodiment

Next, a third embodiment of the present invention will be described.

In the third embodiment, the range of the size of the copy prohibition mark 100a detectable by the mark detection circuit 14a is extended by a configuration different from that of the second embodiment. Specifically, the mark detection circuit 14a is configured as shown in FIG. 9.

Figure 9:
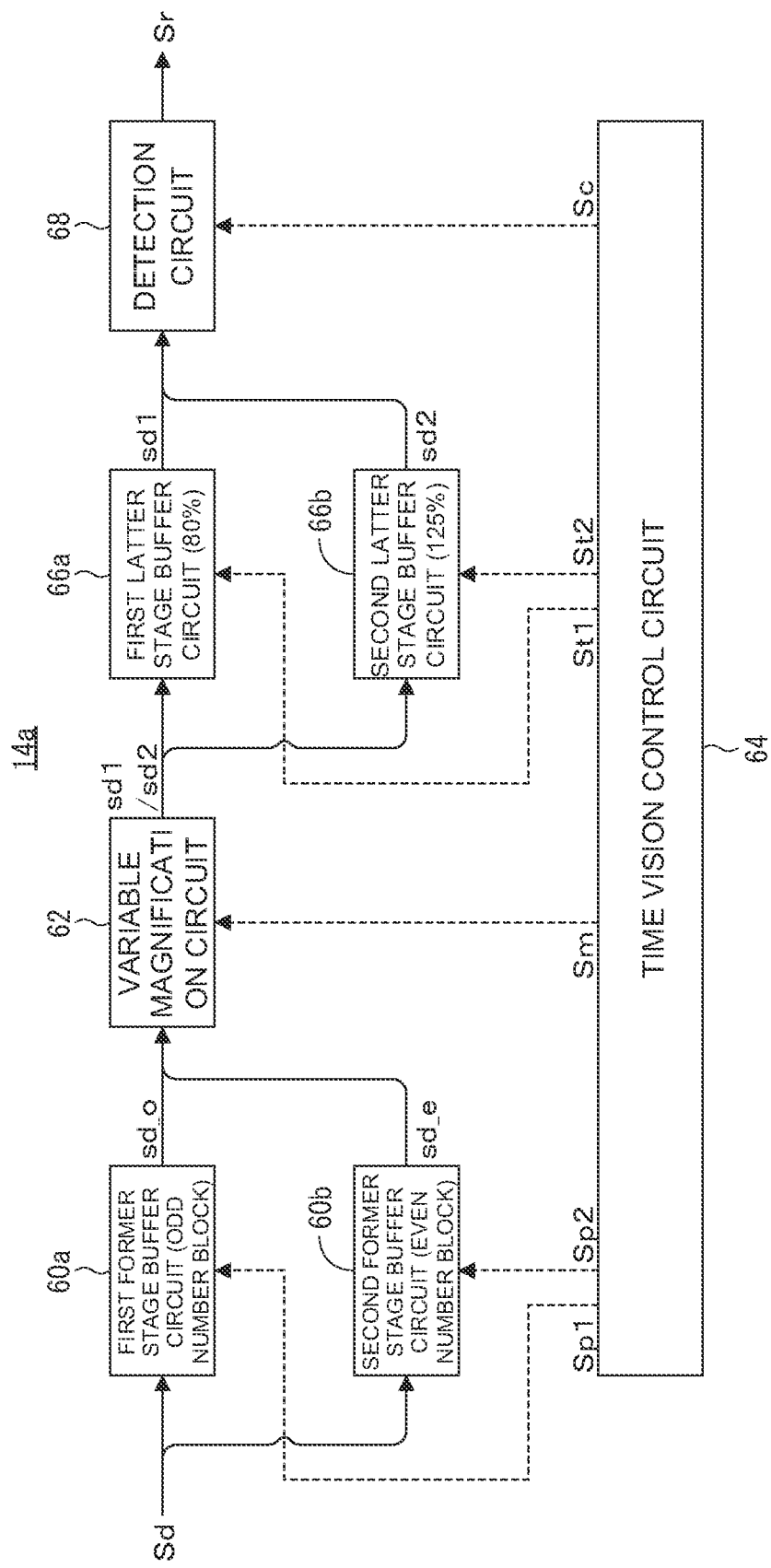
FIG. 9 is a diagram showing a configuration of the mark detection circuit according to a third embodiment of the present invention.

As shown in FIG. 9, the mark detection circuit 14a in the third embodiment has two former stage buffer circuits, a first former stage buffer circuit 60a and a second former stage buffer circuit 60b. Then, the image data Sd subjected to mark detection processing is input to each of these two former stage buffer circuits 60a and 60b.

Figure 10:
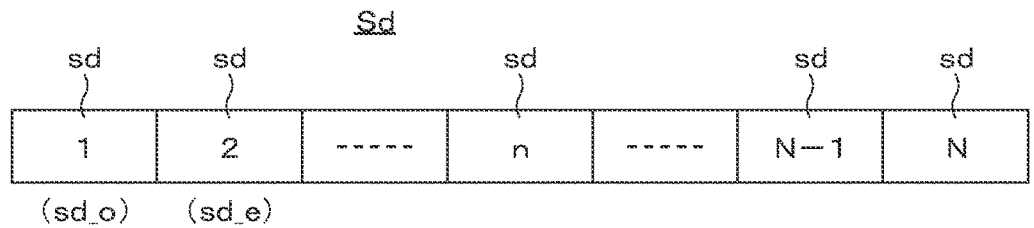
FIG. 10 is a diagram conceptually showing a state in which the image data in the third embodiment is divided into a plurality of blocks.

Here, the image data Sd, that is, the image data Sd input to the mark detection circuit 14a, is divided into a plurality of blocks sd, for example, N (N: integer of 2 or more), as shown in FIG. 10, in the order of being input to the mark detection circuit 14a. Then, in the first former stage buffer circuit 60a, odd-numbered blocks sd_o are sequentially stored, for example, the block sd_o one by one. In addition, in the second former stage buffer circuit Gob, even-numbered blocks sd_e are sequentially stored, for example, the block sd_e one by one. Further, the odd-numbered blocks sd_o stored in the first former stage buffer circuit 60a and the even-numbered blocks sd_e stored in the second former stage buffer circuit 60b are alternately output and then input to the variable magnification circuit 62. That is, (excluding the first (1st) block sd and the last (Nth) block sd), when the (nth) block sd in one of the first former stage buffer circuit 60a and the second former stage buffer circuit 60b is stored, the (n−1st) block sd stored in the other of the first former stage buffer circuit 60a and the second former stage buffer circuit 60b is output and then input, to the variable magnification circuit 62. That is, for accomplishing the above, the first former stage buffer circuit 60a, specifically, the writing/reading operation of the first former stage buffer circuit 60a is controlled by a first former stage buffer control signal Sp1 given from a time division control circuit 64. Then, the second former stage buffer circuit 60b, specifically, the writing/reading operation of the second former stage buffer circuit 60b is controlled by a second former stage buffer control signal Sp2 given from the time division control circuit 64. The number of divisions (number of blocks sd.) N of the image data Sd changes, for example, depending on the size (capacity) of the image data Sd, in particular, the number of pixels.

For each of the odd-numbered block sd_o input from the first former stage buffer circuit 60a and the even-numbered block sd_e input from the second former stage buffer circuit 60b, the variable magnification circuit 62 executes, sequentially, so to speak, in a time division manner, the variable magnification processing (reduction processing) with a magnification of 80% and the variable magnification processing (enlargement process) with a magnification of 125%. Therefore, the variable magnification circuit 62 has a high processing capacity capable of executing, in a time division manner, the variable magnification processing by these two magnifications. Then, the variable magnification circuit 62 sequentially, that is, in a time division manner outputs the data after the variable magnification processing by these two magnifications, that is, a block sd1 after the variable magnification processing by the variable magnification of 80% and a block sd2 after the variable magnification processing by 125%. The blocks sd1 and sd2 output from the variable magnification circuit 62 are input to a first latter stage buffer circuit 66a and a second latter stage buffer circuit 66b, respectively. Further, in the variable magnification circuit 62, in particular the switching operation of the variable magnification processing with two magnifications of 80% and 125% is controlled by a variable magnification control signal Sm given from the time division control circuit 64.

As described above, the block sd1 after the variable magnification processing at a magnification of 80% and the block sd2 after the variable magnification processing at a magnification of 125% are input to the first latter stage buffer circuit 66a. Of these, the block sd1 after the variable magnification processing with a magnification of 80% is stored in the first latter stage buffer circuit 66a, for example, the block sd1 one by one. In addition, the block sd1 after the variable magnification processing at a magnification of 80% and the block sd2 after the variable magnification processing at a magnification of 125% are also input to the second latter stage buffer circuit 66b. Of these, the block sd2 after the variable magnification processing with a magnification of 125% is stored in the second latter stage buffer circuit 66b, for example, the block sd2 one by one. Then, the block sd1 stored in the first latter stage buffer circuit 66a and the block sd2 stored in the second latter stage buffer circuit 66b are alternately output and then input to the detection circuit 68. That is, for accomplishing the above, the first latter stage buffer circuit 66a, specifically, the writing/reading operation of the first latter stage buffer circuit 66a is controlled by a first latter stage buffer control signal St1 given from the time division control circuit 64, in addition, the second latter stage buffer circuit 66b, specifically, the writing/reading operation of the second latter stage buffer circuit 66b is controlled by a second latter stage buffer control signal St2 given from the time division control circuit 64.

For each of the block sd1 input from the first latter stage buffer circuit 66a and the block sd2 input from the second latter stage buffer circuit 66b, the detection circuit 68 executes, sequentially, so to speak, in time division manner, the mark detection processing. Therefore, the detection circuit 68 has a high processing capacity capable of executing the mark detection processing for each of the block sd1 and sd2 in a time division manner. Then, the detection circuit 68, when detecting that at least one of the blocks sd1 and sd2 includes the copy prohibition mark 100a, outputs the detection result signal Sr that indicates the above, in other words, that indicates that the copy prohibition mark 100a is included in the image data subjected to output. Meanwhile, when none of the blocks sd1 and sd2 includes the copy prohibition mark 100a, the detection circuit 68 outputs the detection result signal Sr that indicates the above, in other words, that indicates that the copy prohibition mark 100a is not included in the image data subjected to output. Further, in the detection circuit 68, in particular, the switching operation of the mark detection processing for each of block sd1 and sd2 is controlled by the detection control signal Sc given from the time division control circuit 64.

The detection result signal Sr output from the detection circuit 68, that is, the detection result signal. Sr as the output signal of the mark detection circuit 14a is input to the CPU 18a. After that, processing operations are the same as those of the first embodiment (and the second embodiment), including the processing by the CPU 18a.

In this way, according to the third embodiment, the range of the size of the copy prohibition mark 100a detectable by the mark detection circuit 14a is extended by a configuration different from that of the second embodiment. As in the second embodiment, the size of the copy prohibition mark 100a can be dealt with in a wider range by the third embodiment, and in addition, output, by any unauthorized means, of the image data including the copy prohibition mark 100a can be prevented more reliably. That is, more reliable preservation of the image data for which copying is prohibited is achieved.

Further, in the third embodiment, the variable magnification circuit. 62 varies magnifications of respective blocks sd at, two different magnifications, 80% and 1.25%, but the third embodiment is not limited to this. For example, respective blocks sd may be magnified at three or more magnifications different from each other. In this case, latter stage buffer circuits corresponding to respective magnifications, that is, three or more latter stage buffer circuits are provided. Then, the blocks after the variable magnification processing stored in respective latter stage buffer circuits are output in order, that is, in a time division manner, and input to the detection circuit 68. According to this configuration, the range of the size of the copy prohibition mark 100a detectable by the mark detection circuit 14a is further extended.

Further, in the third embodiment, only one detection circuit 68 is provided, but the present invention is not limited to this. For example, two detection circuits corresponding to two latter stage buffer circuits, the first latter stage buffer circuit 66a and the second latter stage buffer circuit 66b, may be provided, and any block after the variable modification processing may be individually input to these two detection circuits from the two latter stage buffer circuits 66a and 66b. Then, each detection circuit may execute the mark detection processing individually, so to speak, in parallel, for the block after each variable magnification processing. This also applies when three or more latter stage buffer circuits are provided as described above.

The variable magnification circuit 62 in the third embodiment is also an example of the variable magnifier according to the present invention. Further, the detection circuit 68 in the third embodiment is an example of the detection executer according to the present invention.

Fourth Embodiment

Next, a fourth embodiment of the present invention will be described.

In the fourth embodiment, when the image data subjected to output is data imported to the multifunction machine 10 from the external device and the image data includes the copy prohibition mark 100a, processing is executed to erase the image data from the external device as a provider. Note that, in the fourth embodiment as well, as in the first embodiment (to the third embodiment), only when the copy prohibition mark 100a is not attached to the image data imported to the multifunction machine 10 from the external device, the image data is output. Meanwhile, when the copy prohibition mark 100a is attached to the data imported to the multifunction machine 10 from the external device, the image data is not output, and in addition, the image data (stored in the auxiliary storage 20) is erased from the auxiliary storage 20.

Figure 11:
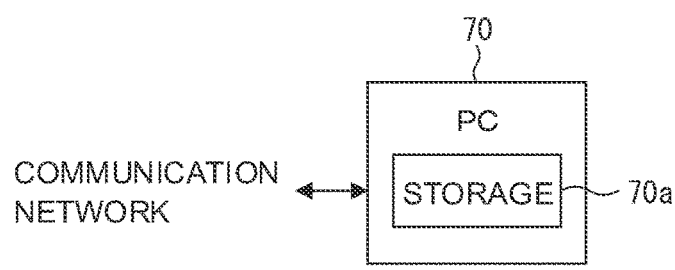
FIG. 11 is a diagram schematically showing a configuration of a personal computer as an external device according to a fourth embodiment of the present invention.

Specifically; for example, it is assumed that a personal computer (PC) 70 as the external device as shown in FIG. 11 is provided with a storage 70a such as a hard disk drive, and the image data stored in the storage 70a is imported from the personal computer 70 to the multifunction machine 10 as output target (including printing). The image data imported from the personal computer 70 to the multifunction machine 10 is given as an ID (identification) as individual identification information for identifying the image data. This ID includes information that, shows the provider of the image data, here information that indicates the personal computer 70.

Here, for example, when the image data subjected to output imported from the personal computer 70 as the external device to the multifunction machine 10 does not have the copy prohibition mark 100a, the image data is output. Meanwhile, when the copy prohibition mark 100a is attached to the image data subjected to output, the image data is not output, and the image data (stored in the auxiliary storage 20) is erased from the auxiliary storage 20. Further, when the image data subjected to output includes the copy prohibition mark 100a, an instruction to erase the image data from the storage 70a of the personal computer 70 as the provider of the image data is given from the multifunction machine 10 to the personal computer 70. In response to this instruction, on the personal computer 70 side, the image data corresponding to the instruction is erased from the storage 70a.

Figure 12:
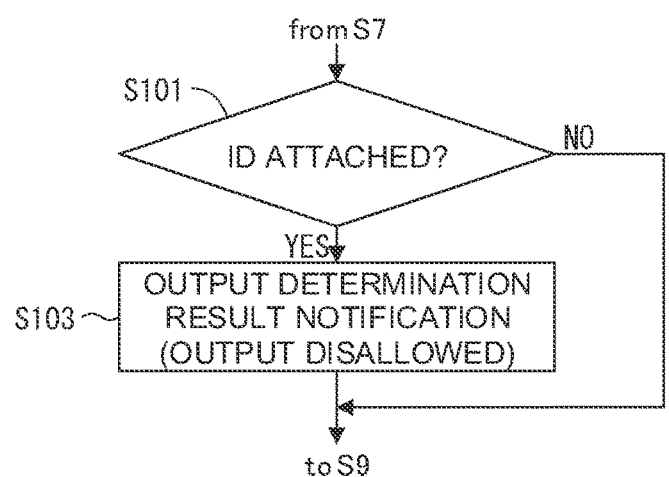
FIG. 12 is a flow chart showing the flow of a part of the image output control task in the fourth embodiment.

In this fourth embodiment as well, the CPU 18a executes the output control task described above (FIG. 5), and in particular, after executing step S7, executes step S101 shown in FIG. 12. That is, the CPU 18a, in step S7, disallows the output of the image data subjected to output, and then advances the processing to step S101.

In this step S101, the CPU 18a determines whether or not an ID is given to the image data for which output is disallowed in step S7 above. In other words, based on whether the image data for which output is disallowed is given the ID, the CPU 18a determines whether the image data is data imported from any external device including the personal computer 70. Here, for example, when the image data for which output is disallowed is given an ID, that is, when the image data is the data imported from the external device (S101: YES), the CPU 18a advances the processing to step S103. Meanwhile, when the image data for which output is disallowed is not given an ID, that is, when the image data is not the data imported from the external device (S101: NO), the CPU 18a skips step S103 and advances the processing to step S9. Further, as mentioned above, in step S9, the CPU 18a outputs the predetermined warning message for a certain period.

In step S103, the CPU 18a notifies the external device as the provider of the image data, here the personal computer 70, of the output determination result indicating that the output of the image data subjected to output is disallowed. This output determination result notification is given the ID for the image data for which output is disallowed. After executing this step S103, the CPU 18a advances the processing to step S9.

Figure 13:
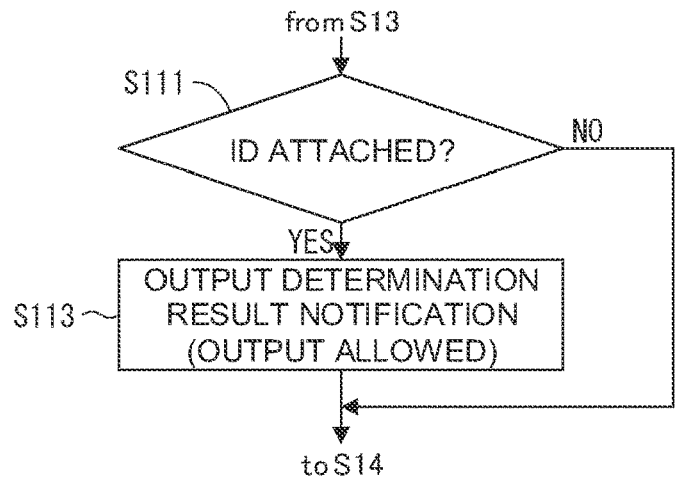
FIG. 13 is a flow chart showing the flow of another part of the image output control task in the fourth embodiment.

Further, after executing step S13 shown above (FIG. 5), the CPU 18a executes step S111 shown in FIG. 13. That is, the CPU 18a, in step S13, allows the output of the image data subjected to output, and then advances the processing to step S111.

In this step S111, the CPU 18a determines whether or not the image data for which output is allowed in step S13 above is given an ID. In other words, based on whether the image data for which output is allowed has an ID, the CPU 18a determines whether the image data is data imported from any external device including the personal computer 70. Here, for example, when the image data for which output is allowed is given an ID, that is, when the image data is the data imported from the external device (S111: YES), the CPU 18a advances the processing to step S113. Meanwhile, when the image data for which output is allowed is not given an ID, that is, when the image data is not the data imported from the external device (S111: NO), the CPU 18a skips step S113 and advances the processing to step S14. Further, as mentioned above, in step S14, the CPU 18a waits for completion of the output of the image data for which output is allowed.

In step S113, the CPU 18a notifies the external device as the provider of the image data, here, the personal computer 70, of the output determination result indicating that the output of the image data subjected to output is allowed. This output determination result notification is given the ID for the image data for which output is allowed. After executing this step S113, the CPU 18a advances the processing to step S14.

Figure 14:
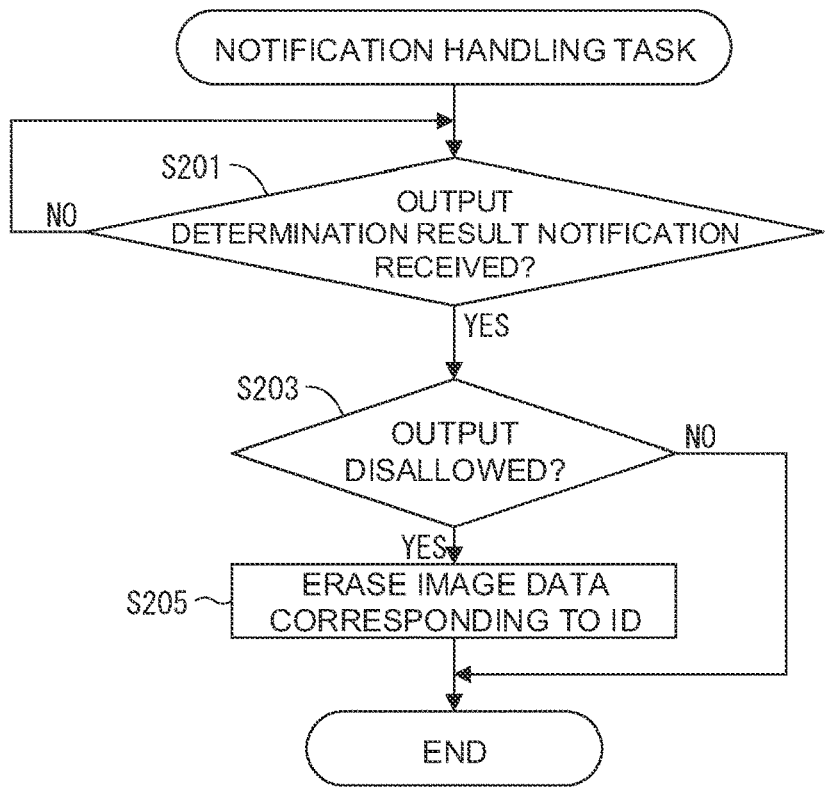
FIG. 14 is a flow chart showing the flow of a notification handling task in the fourth embodiment.

Meanwhile, on the personal computer 70 side, the notification handling task is executed by a CPU (not illustrated) of the personal computer 70 in the flow shown in FIG. 14. This notification handling task is executed according to, for example, a notification handling program built into a device driver for the multifunction machine 10. According to this notification handling task, in step S201, the CPU of the personal computer 70 first waits for the output determination result notification to be sent from the multifunction machine 10 (S201: NO). Then, receiving the output determination result notification from the multifunction machine 10 (S201: YES), the CPU advances the processing to step S203.

In step S203, from the output determination result notification received in step S201, the CPU of the personal computer 70 determines whether or not the output of the image data subjected to output is disallowed. Here, for example, when the output of the image data subjected to output is disallowed (S203: YES), the CPU recognizes that the CPU has been instructed to erase the image data from the storage 70a, and advances the processing to step S205. Meanwhile, when the output of the image data subjected to output is allowed (S203: NO), the CPU ends the notification handling task.

In step S205, from the storage 70a, the CPU of the personal computer 70 erases the image data corresponding to the ID attached to the output determination result notification received in step S201. With this, the CPU ends the notification handling task.

As described above, according to the fourth embodiment, when the image data subjected to output is the data imported from the external device such as the personal computer 70 to the multifunction machine 10, and the image data includes the copy prohibition mark 100a, processing is executed to erase the image data from the external device as the provider of the image data. That is, even when the image data subjected to output is the data imported from the external device, in the case that the copy prohibition mark 100a is included in the data, the image data is erased from the external device as the provider of the image data. As a result, the output of the image data including the copy prohibition mark 100a is more reliably prevented, that is, the image data is more reliably preserved.

Further, in the fourth embodiment, the case where the provider of the image data subjected to output is the personal computer 70 has been described, but the present invention is not limited to this. The same applies to a case where any external device other than the personal computer 70 such as a server is a provider of the image data subjected to output. Further, it may be so configured that when the provider of the image data subjected to output is the USB memory above, and the copy prohibition mark 100a is attached to the image data, the image data is erased from the USB memory.

The CPU 18a in the fourth embodiment, in particular, the CPU 18a that executes step S103 among the image output control tasks is an example of the erasure controller according to the present invention. Then, step S103 executed by the CPU 18a, that is, the processing for notifying that the output of the image data subjected to output is disallowed is an example of the erasing control processing according to the present invention.

Other Examples of Application

Each of the above examples is a specific example of the present invention and does not limit the technical scope of the present invention. The present invention is applicable to aspects other than these examples.

For example, as the specific image information, the copy prohibition mark 100a which is circular as shown in FIG. 2 has been illustrated, but any other mark and pattern may be adopted as the specific image information.

The mark detection circuit 14a is configured by ASIC, but it is not limited to this. The mark detection circuit 14a may be configured by PLD (programmable logic device) such as CPLD (complex programmable logic device) and FPGA (field programmable gate array) or by any other hardware element. Further, the mark detection circuit 14*a*, may be configured by any element combined with software such as CPU and DSP.

In addition, the mark detection processing by the mark detection circuit 14*a* is executed in the process of the image processing by the image processor 14 (so to speak, in the middle stage), but the present invention is not, limited to this. For example, the mark detection processing may be executed before the image data subjected to output is subjected to the image processing by the image processor 14, or after the image processing (such as variable magnification processing) by the image processor 14 is executed.

Further, in each embodiment, the case where the present invention is applied to the multifunction machine 10 which is a kind of image output device has been described, but the present invention is not limited to this. The present invention is also applicable to an image output device dedicated to a single function, such as a copy machine, a printer, an image scanner, or a fax machine.

In addition, the present invention can be provided not only in the form of an image output device, but also in the form of a program called a control program of an image output device and in the form of a method of controlling an image output device.

Further, the present invention can also be provided in the form of a storage medium called a computer-readable recording medium in which the control program of the image output device is recorded. The recording media referred to here include disc media such as a CD (compact disc), a DVD (Digital Versatile Disc), and a flexible disk. In addition, any semiconductor medium such as USB memory and SD (Secure Digital) memory card can also be applied as the recording medium referred to here. In addition, instead of a portable medium, an embedded (built-in) medium incorporated in an image output device such as a ROM or a hard disk drive can also be applied as the recording medium referred to here.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image output device that includes a storage and outputs image data stored in the storage, the image output device comprising:
   a detector that detects whether or not specific image information is included in the image data;
   an output controller that allows an output of the image data when the image data does not include the specific image information, and disallows the output of the image data when the image data includes the specific image information; and
   an eraser that erases the image data from the storage when the specific image information is included in the image data, wherein
   the detector includes
   a variable magnifier that varies magnification of the image data at a plurality of magnifications different from each other, and
   a detection executer that detects whether or not the specific image information is included in each of a plurality of data after being variably magnified at the plurality of magnifications by the variable magnifier.

2. The image output device according to claim 1, wherein the variable magnifier is provided corresponding to the plurality of magnifications, and includes a plurality of individual variable magnifiers that variably magnifies the image data at the magnifications corresponding the image data.

3. The image output device according to claim 1, wherein the variable magnifier variably magnifies the image data sequentially at the plurality of magnifications.

4. The image output device according to claim 3, wherein the variable magnifier divides the image data into a plurality of blocks and variably magnifies the image data sequentially at the plurality of magnifications for each of the plurality of blocks.

5. The image output device according to claim 4, wherein the image data is sequentially divided into the plurality of blocks from a portion input first to the variable magnifier.

6. The image output device according to claim 1, wherein the detection executer includes a plurality of individual detectors that is provided corresponding to the plurality of data after being variably magnified, and detects whether or not the specific image information is included in the respectively corresponding data after being variably magnified.

7. The image output device according to claim 1, wherein the detection executer sequentially detects whether or not the specific image information is included in the plurality of data after being variably magnified.

8. The image output device according to claim 1,
   wherein the image data is data acquired from an external device, and
   wherein the image output device further comprises an erasure controller that executes erasing control processing for erasing the image data from the external device when the specific image information is included in the image data.

9. The image output device according to claim 1, further comprising an image forming portion that outputs the image data by forming, on an image recording medium, an image which is based on the image data.

10. A non-transitory storage medium that stores a control program, the storage medium being of an image output device that includes a storage and outputs image data stored in the storage, the storage medium causing a computer of the image output device to execute:
    detecting whether or not specific image information is included in the image data;
    controlling an output in a manner to allow the output of the image data when the image data does not include the specific image information, and disallow the output of the image data when the image data includes the specific image information; and
    erasing the image data from the storage when the specific image information is included in the image data, wherein
    the detecting includes
    varying magnification of the image data at a plurality of magnifications different from each other, and
    executing detection of whether or not the specific image information is included in each of a plurality of data after being variably magnified at the plurality of magnifications in the varying.

11. A control method of an image output device that includes a storage and outputs image data stored in the storage, the control method comprising:
    detecting whether or not specific image information is included in the image data;
    controlling an output in a manner to allow the output of the image data when the image data does not include the specific image information, and disallow the output of the image data when the image data includes the specific image information; and erasing the image data from the storage when the specific image information is included in the image data, wherein the detecting includes varying magnification of the image data at a plurality of magnifications different from each other, and executing detection of whether or not the specific image information is included in each of a plurality of data after being variably magnified at the plurality of magnifications in the varying.

\* \* \* \* \*